United States Patent [19]
Eichstädt

[11] Patent Number: 5,791,020
[45] Date of Patent: Aug. 11, 1998

[54] APPARATUS FOR AND METHOD OF SECURING ARTICLES AND/OR PACKAGING CONTAINERS ON TRANSPORT PALLETS

[75] Inventor: Hans-Peter Eichstädt, Hamburg, Germany

[73] Assignee: Firma Sanpack Lagertechnik GmbH, Glinde, Germany

[21] Appl. No.: 675,610

[22] Filed: Jul. 3, 1996

[51] Int. Cl.⁶ .................................................. B65D 63/02
[52] U.S. Cl. ...................... 24/16 R; 428/204; 53/399; 57/260; 24/30.5 P
[58] Field of Search .................... 24/16 R, 30.5 R, 24/30.5 P, 715.3, 482, DIG. 16; 53/399, 441; 57/3, 12, 281, 282, 287; 428/247, 248, 255, 43, 189

[56] References Cited

U.S. PATENT DOCUMENTS

| | | | |
|---|---|---|---|
| 2,386,666 | 10/1945 | Dinsmore | 428/204 |
| 2,403,317 | 7/1946 | Warren, Jr. | 57/260 |
| 3,028,281 | 4/1962 | Karass | 24/16 R |
| 3,164,948 | 1/1965 | Stratford | 57/260 |
| 3,322,325 | 5/1967 | Bush | 24/16 R X |
| 3,327,468 | 6/1967 | Page | 57/260 |
| 3,707,021 | 12/1972 | Norman | 24/16 R |
| 3,913,178 | 10/1975 | Ballin | 24/16 R |
| 4,503,658 | 3/1985 | Mouser et al. | 53/399 |
| 5,372,866 | 12/1994 | Oberländer et al. | 428/110 |
| 5,479,681 | 1/1996 | Muraoka | 24/16 R |
| 5,487,928 | 1/1996 | Fujimoto | 428/36.4 |
| 5,491,021 | 2/1996 | Tolliver et al. | 428/217 |
| 5,540,963 | 7/1996 | Wong | 428/35.7 |
| 5,584,103 | 12/1996 | Slavin | 24/16 R |

FOREIGN PATENT DOCUMENTS

| | | | |
|---|---|---|---|
| 293605 | 8/1915 | Germany | 57/31 |
| 316068 | 12/1917 | Germany | 57/31 |
| 314580 | 9/1919 | Germany | 51/31 |
| 46-42062 | 12/1971 | Japan | 51/260 |

*Primary Examiner*—James R. Brittain
*Assistant Examiner*—Robert J. Sandy
*Attorney, Agent, or Firm*—Henry M. Feiereisen

[57] ABSTRACT

An elastic band for securing an object for transport is comprised of a stretchable sheet exhibiting an elongation limited to an elastic range of the sheet. The sheets is transformed to a string-like or band-like elastic strap exhibiting deformations extending substantially in longitudinal direction of the sheet. The strap is wrapped around the object in snug fits as a result of a return force generated by the elastic elongation. The deformations are imparted through suitably puckering, rolling or twisting the sheet.

39 Claims, 3 Drawing Sheets

5,791,020

APPARATUS FOR AND METHOD OF SECURING ARTICLES AND/OR PACKAGING CONTAINERS ON TRANSPORT PALLETS

BACKGROUND OF THE INVENTION

The present invention refers to an elastic band for securing a transport unit for transporting at least one article. The present invention is also directed to a method of and apparatus for securing articles and/or packaging containers transported on pallets or the like by wrapping an elastically stretchable sheet-like strip about the articles and/or packaging containers on the pallet and, optionally, around parts of the pallet.

Elastic bands are frequently used in the packaging industry to prevent shipped articles from uncontrolled shifting during transport, e.g. by falling off a pallet, loosening from the packaging container, or altering a predetermined packaging configuration such as an unwinding of a sheet roll. Typically, rubber bands are used to wrap and keep the lot of articles together during transport. These rubber bands may be used to wrap only the article, for example when formed to a roll to secure it against unwinding, or to wrap the articles together with the transport container e.g. a pallet, on which the articles are stacked.

In the shipping industry, the speed by which the articles are wrapped is of great importance. When encountering during packaging of the articles that a particular individual article has left its assigned spot, e.g. on a pallet, this article is subsequently secured on this pallet by a rubber band that is wrapped around the article and the pallet. Also in cases in which a rolled up article has lost its rolled configuration, a rubber band is wrapped around the roll to prevent a further unwinding of the article.

Rubber bands are typically used in large quantities at the loading site. In general, these rubber bands are considered lost packaging material as no efforts are spend to collect these items for reuse. In most cases, the rubber bands are even cut in pieces which basically precludes their use for further packaging purposes. Rubber bands of this type are however expensive and sometimes are not available in the required quantities. Moreover, the rubber bands are utilized only in ring-shape and are cut and discarded at the place of destination for the shipment. Moreover, depending on the articles being packaged, ring-shaped rubber bands must be made available in various sizes so that the stock becomes rather cumbersome.

SUMMARY OF THE INVENTION

It is an object of the present invention to provide an improved elastic band obviating the aforestated drawbacks.

In particular, it is an object of the present invention to provide an improved elastic band of the aforementioned type which considerably reduces the manufacturing costs as well as stock keeping costs.

It is still an object of the present invention to provide an improved method and apparatus for wrapping articles in a cost-efficient and simple manner.

These objects, and other which will become apparent hereinafter, are attained in accordance with the present invention by providing the band in the form of a stretchable sheet exhibiting an elongation limited to the elastic range of the sheet.

A band of this type retains its elasticity over a wide range of its extendibility, and can be stretched commensurate with the task at hand, i.e. in order to wrap a relatively large object, the band is prestretched to a greater extent than in case of wrapping smaller object. The initial length of the band is not influenced thereby and thus is suitable for wrapping smaller as well as larger objects.

Moreover, a band according to the invention is not required to be stocked in form of rings. Even though, stocking of ring-shaped bands has the advantage of being immediately usable and avoiding the necessity to tie the ends of the sheets in situ, in connection with handling articles that exhibit substantial size differences, it may be appropriate to shape the bands in ring form only at the site of use. For this purpose, two opposing ends of a straight band are joined together at the job site, e.g. after wrapping an article, with the respectively desired extension being imposed on the band during the wrapping operation.

Suitably, the sheet is shaped in form of a string-like or band-like elastically stretchable strap which exhibits deformations essentially in longitudinal direction of the sheet. These deformations provide the strap with a relatively high tear resistance. The area of the deformations exhibits folds which exhibit a comparably high tear resistance commensurate with the number of overlying sheet layers. This high tear resistance is advantageous, e.g. when wrapping the strap about sharp edges or corners.

In accordance with another feature of the present invention, the stretched strap wraps tightly around the article and/or transport unit as a consequence of its return force effected by its elastic elongation so that the article retains its packaging configuration and is kept in place on the packaging container even when being significantly shaken during transport. The article neither shifts relative to the transport unit nor is the make-up thereof altered in any way, which means that even rolled articles will not loose this configuration.

The sheet according to the present invention may also exhibit deformations in the form of windings, with sections of the sheet being joined together. In this manner, the sheet is stretched and thereby receives its desired elasticity.

The sheet may also be puckered transversely to the longitudinal direction of the strand by simply grasping the ends of a flat sheet by hand and stretching the sheet in a desired manner so that the sheet becomes automatically wrinkled without any further manipulations.

Deformations may also be effected through twisting to provide the high tear resistant sheets.

According to another feature of the present invention, the unstretched, deformed strand exhibits a large, air-filled void volume to have a specific weight that is smaller than 0.5 g/cm$^3$, preferably smaller than 0.3 g/cm$^3$. Such a strand retains its elasticity and still exhibits great resistance against mechanical stress, e.g. against tearing or local overstretching.

Puckering, rolling and/or twisting of a strip of sheet transforms a wide, flat sheet strip of slight strength into a narrow strap of preferable string-like or band-like configuration which is relatively thick with respect to the strength of the sheet strip and is as elastically stretchable in longitudinal direction as a flat sheet strip but in contrast thereto can be handled much easier by hand. After attachment, the tension of the puckered, rolled and/or twisted sheet strip or strap effects a tight wrapping of the sheet about the articles and/or packaging containers which are thus prevented from shifting and securely kept in place together.

Although a packaging cord is known which is made from twisted strands, this cord is not elastically extendible and does not exhibit any stretching properties. The reason being that the strand used for the cord is devoid of any elastic properties or is prestretched to such an extent that a possibly existing elasticity is lost.

Many manufacturing plants utilize processes and apparatuses to wrap loaded pallets to prevent adjoining and stacked articles and/or packaging containers, such as cartons, boxes, drums or the like, loaded on pallets from escaping the assembled formation and falling off the pallet during the transport to a customer. The strip of sheet wound onto a supply spool in web-like manner is wrapped in several overlying or stacked layers around the articles and/or packaging containers placed on a rotary table by means of an apparatus described e.g. in U.S. Pat. No. 4,503,658 while being simultaneously stretched, with the sheet web being tightly placed about the articles and/or packaging container after wrapping as a result of a stretching effect caused by the elastic return force of the stretched sheet. Other examples of conventional wrapping devices include a carriage with supports a supply spool and travels around the pallet loaded with articles and/or packages while dispensing the sheet strip. This wrapping technique is typically applied with wide sheet webs which are wrapped around the pallet and the stacked articles several times, mostly two times. A deformation of the sheet is effected only when the sheet is wrapped around the article and the pallet. This deformation however is not effected in longitudinal direction of the sheet to generate a strap but merely has the objective to tightly wrap a transport unit in form of a pallet and a stacked lot of articles. In contrast thereto, the straps according to the present invention are utilized to secure the single article for safe transport to prevent e.g. an opening or unwinding. For this purpose, the conventional winding technique is not suitable.

The straps according to the present invention are deformed in longitudinal direction. In this context, the term "puckering" is used to express a condition in which several substantially parallel partial sections overlay one another transversely to the longitudinal direction. A strap made through puckering can be simply made by moving the longitudinal side edges towards each other to thereby limit the height of the produced folds. A puckered strap may also be made e.g. by overlying folding of preferably equally wide parallel sections of the flat sheet strip transversely to its longitudinal direction.

A rolled sheet strip is created by rolling the sheet strip transversely to its longitudinal direction, possibly after previously folding the sheet strip once or several times in the same direction in order to facilitate the rolling action. The strap formed thereby exhibits side edges extending in longitudinal direction and exhibits a spiral-shaped cross-section transversely thereto.

A twisting of the sheet strip about its longitudinal axis is typically effected by turning the ends of the strip about the longitudinal axis in opposite direction. Alternatively, the sheet strip may also be clamped at one point, with the outwardly projecting free end being turned in one direction about the rotational axis and the sheet strip being severed at the clamping point. As a result of a twisting operation, the sheet strip is transformed into a rope-like twisted strap, with its longitudinal side edges extending in form of a spiral about the longitudinal axis.

Preferably, the sheet is made of plastic material, preferably plastic material that is typically used for web-like sheets for wrapping articles and/or packaging containers. As a result of a zigzag alignment of the molecular chains in longitudinal direction of the sheet strip, sheets of this type of material are elastically extendible under tension to a certain extent until exhaustion of their elongation, and contract to a certain extent after removal of the tensile force so that the sheet strip exhibits in a certain stretching range properties which resemble those of rubber-based elastic materials.

Preferably the material properties, in particular the deformability and the dimensions of the sheet strip transversely to its longitudinal axis are suited to each other in such a manner that the puckered, rolled, and/or twisted sheet strip can be easily stretched by hand without great effort, preferably however not significantly beyond its extendibility. To permit a sufficient stretching while yet preventing a tearing or severing of the sheet strip during stretching, the extensibility of the initial material used for the flat sheet strip should range between 300% and 700%, and the sheet strip should exhibit a tear resistance between 25 and 40 $N/mm^2$, preferably more than 35 $N/mm^2$ in relation to the width of the sheet strip.

Advantageously, commercially available films of PVC, polyethylene, especially LLDPE, polypropylene, polyester, polycarbonate or the like with a strength of less than 0.1 mm, preferably less than 0.05 mm are used, with the width of the sheet strip, before being puckered, rolled and/or twisted, ranging in dependence on the material properties between 0.05 m and 0.5 m. In particular cases, this range may also be exceeded or lower. Preferably, widths between 100 and 200 mm are selected in order to attain the desired strength properties at sheet strengths between 0.015 and 0.05 mm. The used puckered, rolled and/or twisted sheet strips are stretchable up to 600% depending on the thickness and material selection in a same manner as smooth sheet webs for wrapping articles and/or packaging containers. This results in a strap which depending on the width of the sheet strip has the thickness of a thread or a cord. The elasticity of the strap does not precisely correspond to the one of rubber-based elastic materials such as caoutchouc or the like. In particular, a greater elongation effects also a non-elastic deformation, i.e. the strap does not revert to the initial state after the elongation but is slightly longer than in the unstretched state. This, however, is insignificant for the intended applications because the strap exhibits after attachment a significant elongation and moreover should not be reused anyway. Relevant is only that the necessary length elongation of the strap is reversed after releasing the strap, whereby the strap may be slipped over the object in form of a sling or loop and has a smaller length compared to the circumferential dimensions of the articles and/or packaging containers, or wrapped around the object with its extreme ends being tied together. These conditions are met by the sheet strip according to the present invention.

The straps used for wrapping stacks of articles or packaging containers or for wrapping standardized pallets can be pre-manufactured and acquired by the user at a particular length. The user may also cut the straps to a desired length from an endless sheet strip that is wound on a supply spool or stored in form of overlying loops within a container, with the sheet strip being already puckered and/or twisted by the manufacturer.

Advantageously, before separation, the sheet strip may be part of a web-like sheet that is wound onto a supply spool and has a width which suitably equals the width of a sheet strip, with the sheet being formed at predetermined distances with perforations or the like to provide sections commensurate with the length of the required sheet strip to facilitate a separation of a sheet strip from the spool by hand. Puckering, rolling and/or twisting of the sheet strip can be effected in a simple manner by hand, whereby the rolling of the sheet strip is carried out after the separation, while puckering and/or twisting can be done shortly before or after separation of the sheet strip. Alternatively, puckering, rolling and/or twisting of the web-like sheet strip may also be effected by simple devices, e.g. by a device that has behind the supply spool a narrow gap through which the sheet strip is drawn to effect in a puckering, or by guiding the sheet strip through a device that resembles those used for twisting band-like barbed wire.

Upon use of elongated sheet strips, the opposite ends thereof can be joined together before the sheet strip is wrapped around the article, preferably by welding or bonding, or after the sheet strip is wrapped around the article. e.g. by tying the ends together to form a knot. Stretching of the sheet strip is suitably effected during wrapping of the articles and/or packaging containers whereby in the event the ends of the sheet strip are joined together before wrapping, the sheet strip is imparted with the elongation when being slipped over the articles and/or packaging containers while in the event the ends of the sheet strap are joined together after wrapping, the ends are suitably pulled together for formation of the knot. After the sheet strip is slipped over the articles or the end of the sheet strip are pulled together after wrapping operation, the elastic return force causes the stretched sheet strip to contract and thereby to tightly bear from outside against the articles and/or packaging containers and to securely keep them together.

Instead of elongated sheet strips that have extreme ends joined together before or during wrapping around the articles and/or packaging container, it is also possible to use sheet strips made of ring-shaped configuration already at the manufacturer's end. Sheet strips of this type can be produced e.g. by separating short sections from an extruded tubular sheet, whereby the puckering or rolling in longitudinal direction of the sheet strip can be effected before or after separation at the manufacturer end as well as at the consumer end. It is also possible to overlay two sheet webs and to weld them together at predetermined distances preferably via two succeeding welding seams extending transversely to the longitudinal direction, with perforations being provided between the welding seams for facilitating a separation of the sheet strips which after the welding operation are rolled onto a supply spool either in form of a web or in puckered, rolled and/or twisted state.

The length of a strap in the form of a sling or a loop that is slightly too long in relation to the circumferential dimensions of the articles and/or packaging containers, can be shortened by forming a knot and thereby simultaneously stretching the sheet strap. Very long straps can be wrapped around the articles and/or packaging containers twice or several times and then connecting the extreme ends in a manner described above. Very long straps in the form of a sling or a loop can also be attached by slipping the sling or the loop over the articles and/or packaging containers, with the remaining projecting part after attachment being intertwined, i.e. two partial areas thereof are placed over one another crosswise and the resulting smaller sling or loop is again slipped over the articles and/or packaging containers. This procedure is continued until the remaining sling or loop cannot be slipped over anymore, and the remaining portion can then be tied to a knot while simultaneously stretching the strap, or can be shortened through welding abutting partial sections.

By repeatedly wrapping a continuous sheet strip around the articles and/or the packaging containers, the turns of the sheet strip around the articles and/or packaging containers extend essentially parallel to one another. However, the sheet strip can be wrapped around the articles and/or packaging containers also in such a manner that individual turns extend in two or also three planes perpendicular to each other, with the windings crossing each other at the opposing sides of the stack of articles and/or packaging containers. Upon use of elongated sheet strips, it is then advantageous to secure crossing partial section at the points of intersection through interlacing one partial section with the other to secure them in place.

The puckered, rolled and/or twisted sheet strips or straps are useable not only for securing articles and/or packaging containers but may also be used as substitute for threads or cords for tying up packages or for tying together rolled merchandise such as carpets or the like. Further examples for use of the sheet strips according to the present invention include securing closet doors during transport of closets.

In accordance with the present invention, an apparatus for dispensing a band to secure a transport unit which supports at least one article is formed as a container which carries the band and includes in draw-off direction of the band an opening for the band for imparting deformations, with the opening being provided with an impediment which can be overcome only by applying a certain force on the band to thereby effect an elongation and deformation thereof. The band is imparted in the opening with the deformations in longitudinal direction thereof during advance through the opening. Suitably, the band may also be twisted in the area of the impediment.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
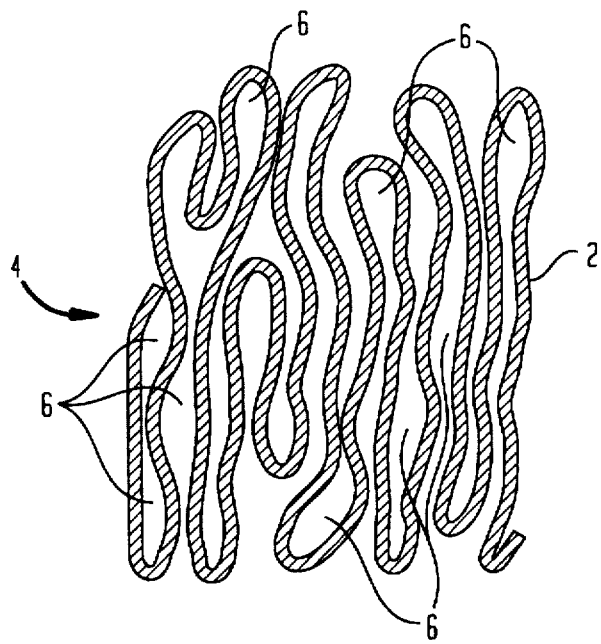
FIG. 1 shows an enlarged cross sectional view of a sheet strip according to the present invention, puckered transversely to its longitudinal direction.

Throughout all the Figures, the same or corresponding elements are generally indicated by the same reference numerals.

Figure 2:
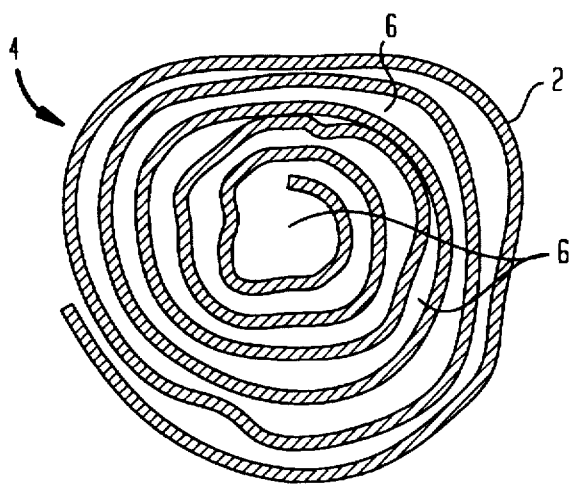
FIG. 2 is an enlarged cross sectional view of a section of a sheet strip according to the present invention, rolled transversely to its longitudinal direction to form a spiral.
Figure 3:
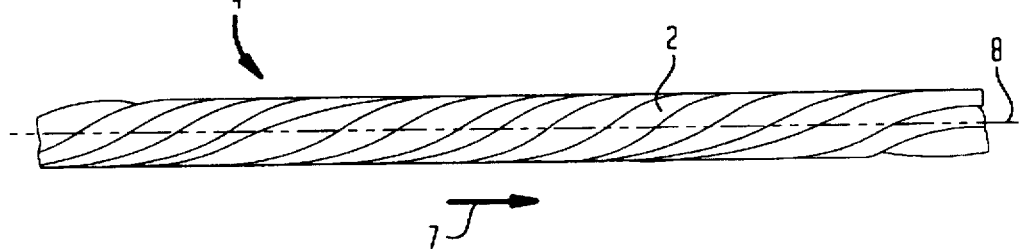
FIG. 3 is a side view of a section of a puckered and twisted sheet strip according to the present invention.
Figure 6:
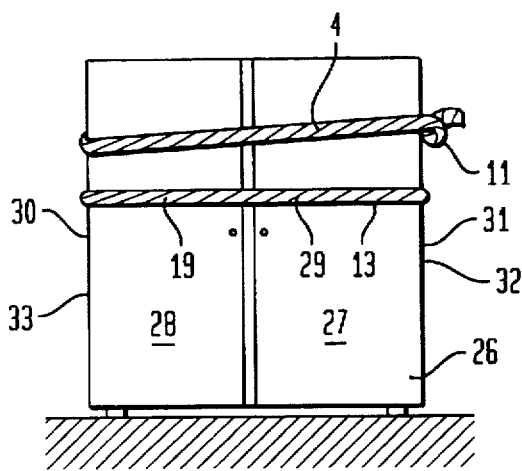
FIG. 6 is a schematic illustration of a closet secured by a puckered sheet strap according to the present invention.

Turning now to the drawing, and in particular to FIGS. 1 to 3, there are shown sectional views of various embodiments of a sheet strip according to the present invention, comprised of an elongated strip 1 which is made from a plastic film or sheet 2 which is elastically stretchable to a limited degree upon application of a tensile force. The sheet 2 exhibits a generally uniform width of 0.1 to 0.5 m and a strength of less than 0.05 mm. Before being wrapped around an article 3 and/or a transport unit 5 (FIG. 7), the strip 1 is puckered transversely to its longitudinal direction as shown in FIG. 1, or rolled as shown in FIG. 2 and, optionally, also twisted about its longitudinal direction, as shown in FIG. 3. The strip 1 of wide, flat and elongated configuration is thus transformed from an item, which at best is very difficult to handle, into a cord-like or band-like strap 4 which can easily be grasped transversely to the longitudinal direction by hand in order to wrap it around or slip it over the articles 3 and/or transport unit 5, whereby its ends 9, 10, as shown in FIG. 6, can be joined together to form a knot 11 while the strap 4 is stretched at the same time.

The initially unstretched strap 4, which is imparted with deformations 29 through puckering, rolling and/or twisting of the strip 1, has a cross-section of relatively great volume of voids 6 so that its specific weight is less than 0.5 g/cm$^3$ which also eases its handling because after attachment to the articles 3 and/or transport unit 5, the strap 4 is not or less likely to be drawn downwards by its own weight. The voids 6 bounded by the sections of the strip 1 are open towards the outside in longitudinal direction as well as transversely thereto so that trapped air can easily escape and as a result the cross-section of the strap 4 considerably decreases during gasping and especially upon elastic stretching as well as formation of the knot 11. Thus, the knot 11 can be securely tied and an unintended loosening thereof is avoided.

The strap 4 is stretched and thereby elastically deformed during wrapping around or slipping over the object, i.e. the articles 3 and/or the transport unit 5, with the elastic deformation containing to a certain extent an inelastic deformation. The portion of elastic deformation must be maintained through suitable material selection at such order that it exceeds the length differential between the respective length of the strap 4, that is required to enable the strap 4 to be slipped over the articles 3 or to allow a knotting, and the circumferential dimensions of the articles 3 and/or the transport unit 5 at the location at which the strap 4 bears against the articles 3 and/or the transport unit 5 after being released. As a result, the stretched strap 4, after being released, tightly wraps the articles 3 and/or the transport unit 5 and securely holds them together in place.

Figure 4:
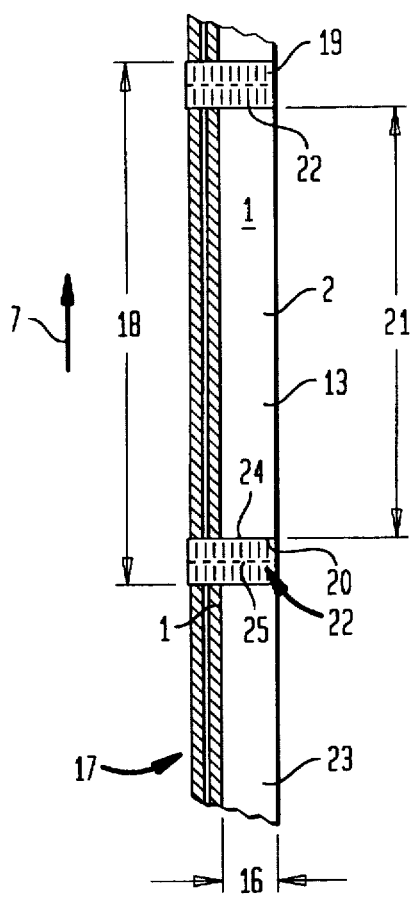
FIG. 4 is a sectional view of a section of a sheet strip of a two-ply sheet.

It is especially suitable to form ring-shaped, endless, closed slings 13 or endless, closed loops 14 from the strip 1. It will be understood that slings 13 and loops 14 differ from one another merely by their different widths, with the width 15 of the loop 14 exceeding a width of the sling 13. Suitably, the slings 13 and the loops 14 are made from a strip 1 of non-deformed plastic sheet 2. As shown in FIG. 4, the plastic sheet 2 has a width 16 and can be superposed such as to form a two-ply sheet 17 with both layers of the plastic sheet 2 placed coextensively with one another. Then, the two-ply sheet 17 is securely joined together at points of attachments 19, 20 which are spaced from each other by a distance 18 while being detached from each other in an intermediate space 20 extending between two neighboring points of attachments 19, 20. Extending transversely to the longitudinal direction 7 of the plastic sheet 2 and formed approximately in the center of each point of attachment 19, 20 is a partition 22 for allowing neighboring slings 13, 23 to be separated from each other, e.g. through application of a tensile force upon both slings 13, 23. The areas 24, 25 of each point of attachment 19, 20 on both sides of the partition 22 are sufficient to effect a permanent connection between both strips 1 of the plastic sheet 2 that form the sling 23.

After separating a sling 23 from its neighboring sling 13 along the partition 22, the sling 23 can now be deformed in longitudinal direction, e.g. through puckering, and subsequently stretched and wrapped around the object, e.g. a closet 26 (FIG. 6). Thus, the closet 26 is secured against unintentional opening and/or damaging of its doors 27, 28 during transport. The sling 13 bears elastically with its deformation 29 on the doors 27, 28 as well as on the side walls 30, 31 and on the not shown back wall of the closet 26 so that the doors 27, 28 are kept closed. The deformations 29 increase the strength of the sling 13 so as to be protected from being worn out by sharp edges 32, 33 when impacted upon during the transport for example by neighboring objects during transport. Moreover, as a result of the deformations 29, the width of the sling 13 is reduced, and the sling 13 can easily be wrapped around the closet 26.

Figure 5:
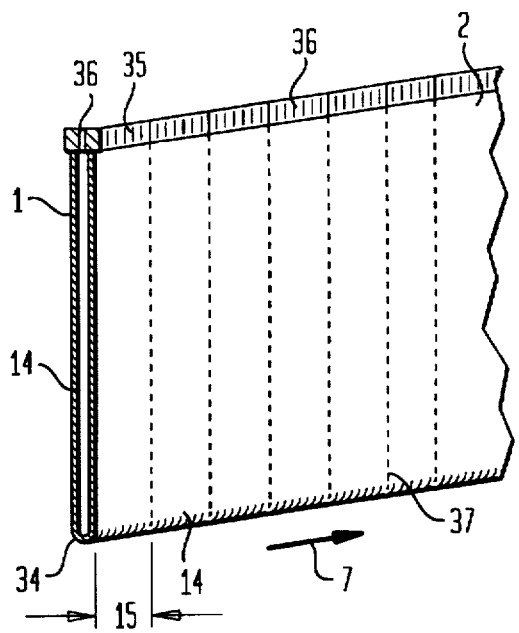
FIG. 5 is a sectional view of a portion of a folded sheet web, with its longitudinal edges being connected together.

As shown in FIG. 5, it is also possible to fold a plastic sheet 2 along a folding edge 34 such that its longitudinal edges 35 are positioned coextensively to one another. The overlaying longitudinal edges 35 are connected to each other, for example by a bonding seam 36. This is effected by applying a glue on at least one of both longitudinal edges 35 for joining with the other longitudinal edge. In this manner, only one bonding seam 36 is necessary in order to make the loops 14 or slings 13. Separation of the loops 14 or slings 13 from the plastic sheet 2 is effected by partition seams 37 which extends transversely to the longitudinal direction 7 of the plastic sheet 2. These partition seams 37 may e.g. be formed by respective perforations. The loops 14 or slings 13 can thus be separated in the desired quantity along these partition seams 37 from the plastic sheet 2.

Figure 10:
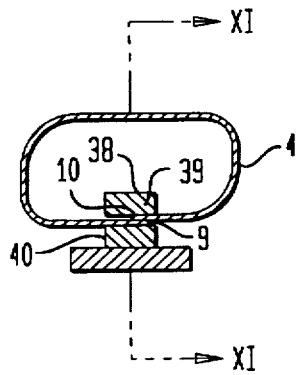
FIG. 10 is a cross sectional view of an apparatus for connecting two ends of a sheet web, taking along the line X—X in FIG. 11.
Figure 11:
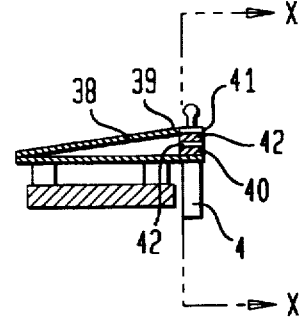
FIG. 11 is a longitudinal section of the apparatus according to FIG. 10, taking along the line XI—XI in FIG. 10.

The use of a bonding seam 36 is also applicable for a two-ply sheet. Instead of using a bonding seam 36, single sheet webs may also be connected through welding. In this case, the plastic sheet 2 is made completely of a thermoplastic material and is heated along the point of attachments 19, 20 or along the longitudinal edges 35 being joined together by means of a heating press 38 to such a temperature that the thermoplastic material starts to soften and is joined together upon application of a pressure generated by the heating press 38. In similar manner, also the ends 9, 10 of a strap 4 can be connected together, with the ends 9, 10 being placed between two opposing pressing arms 39, 40 via which pressure on the one end and heat on the other end is applied upon the ends 9, 10. The pressing arms 39, 40 as shown in FIG. 10 and 11 exhibit pressing surfaces 41 incorporating a heating unit 42, for example an electric resistance heating, which generates sufficient heat to effect a welding of the ends 9, 10 under the action of the applied pressure. Such a heating press 38 can also be used in order to securely and rapidly produce a bonding seam 36.

Figure 12:
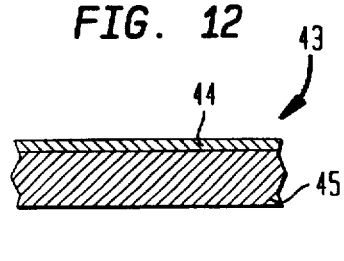
FIG. 12 is a fragmentary cross sectional view of a two ply sheet.
Figure 13:
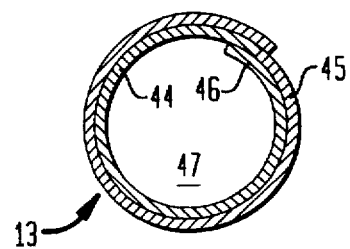
FIG. 13 is a cross-sectional view of a sling formed by a two ply sheet.

It is however also possible to provide the plastic sheet 2 as a multi-layer film, generally designated by reference numeral 43 in FIG. 12. The film 43 has at least a top layer 44 made of thermoplastic material and is fixedly secured upon a substrate 45. As shown in FIG. 13, the multi-layer film 43 is transformed into a sling 13 by detaching the substrate 45 from the top layer 44 in the area of overlap 46 so that in this area, the top layers 44 lay upon each other and can be connected together through welding so that the substrate 45 covers the entire sling 13 either within a ring 47 formed by the sling 13 or about its outer surface.

Figure 7:
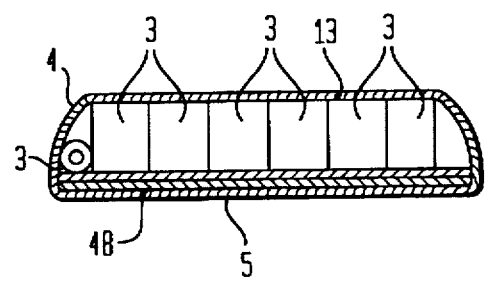
FIG. 7 is a schematic illustration of a lot of articles secured on a pallet by a sheet strip according to the present invention.

As shown in FIG. 7, the sling 13 or the loop 14 can be wrapped around an object such as articles 3 arranged on a transport unit 5, e.g. a pallet with runners 48 between which the strap 4 formed as sling 13 or loop 14 is conducted. The strap 4 is initially stretched to such an extent that the transport unit 5 and the stacked articles 3 are tightly wrapped to ensure that the articles 3 are placed securely on the transport unit 5 without being knocked off during motions of the transport unit 5.

Figure 8:
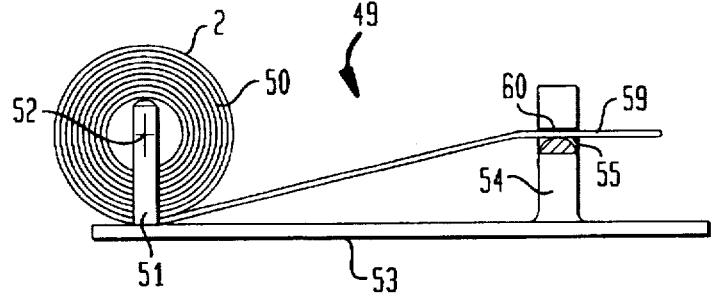
FIG. 8 is a schematic side view of an apparatus for puckering a sheet.
Figure 9:
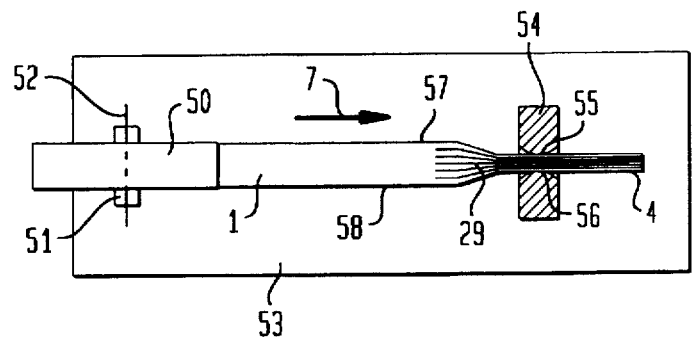
FIG. 9 is a schematic plan view of the apparatus according to FIG. 8.

Turning now to FIG. 8, there is shown an apparatus for dispensing the strip 1 of a plastic sheet 2 and imparting thereupon the required deformations 29 in form of puckering, torsions or twists and for applying a pre-selected elongation upon the strip 1. The strip 1 is rolled onto a supply spool 50 and rotatably supported by a roll-off device 51 for rotation about an axis 52. The roll-off device 51 is securely fixed onto a bottom 53 which also supports at a distance to the roll-off device 51 a deformation unit 54. Formed in the deformation unit 54 is an opening 55 which extends through the deformation unit 54 in direction of the strip 1 rolled off the spool 50. This opening 55 exhibits a predetermined cross section commensurate with the cross-section of the finished strap 4. The strap 4 is produced by pulling the strip 1 through the opening 55 and thereby provide the deformations 29 in the strip 1 as desired for the strap 4.

Suitably, incorporated within the opening 55 is an impediment 56 for reducing the cross-section of the opening 55 to an extent that the passage of the strip 1 through the opening 55 is obstructed. The impediment 56 is of such dimensions that the strap 4 is stretched during advance through the opening 55, and may be determinative for the cross-section of the strap 4. It is readily understandable that the impediment 56 within the opening 55 may also be of adjustable mechanism to form the strap 4 in a desired configuration.

The impediment 56 may also be formed in such a manner that the strip 1 is folded into a number of parallel folds which are twisted relative to each other after leaving the opening 55. It is also possible to provide the impediment 56 in such a manner that the strip 1 is guided centrally by the impediment 56 while both side edges 57, 58 are twisted relative to each other.

As further shown in FIG. 8, the apparatus 49 may include a cutting edge 60 at the outlet 59 facing away of the spool 50 which can either project partially into the opening 45 or completely circumscribe it. The cutting edge 60 is positioned immediately adjacent the formed strap 4 so that the strap 4 can be separated from the strip 1 through movement in direction towards the cutting edge 60.

To secure an object, e.g. a closet 26 or a transport unit 5 loaded with articles 3, a piece of a strip 1 of plastic sheet 2 is separated and provided with deformations 29. These deformations 29 can be created by grasping the strap 4 severed from the strip 1 and forcefully stretching it, thereby effecting deformations 29 in form of e.g. wrinkles, torsions or twists. At the same time, the plastic sheet 2 is prestretched in the elastic range without exceeding this elastic range. The thus-formed strap 4 can then be wrapped around the object such as closet 26 or the transport unit 5 and the stacked lot 3 and connected to each other by a knot 11. The strap 4 snugly fits elastically upon all surfaces of the object which is thus secured for the subsequent transport.

When using a pre-manufactured slings 13 or loops 14 for securing the object, these slings 13 or loops 14 are in most cases already provided in a puckered, rolled and/or joined conditions. It is however also conceivable to separate a sling 13 along its partition 22 from a strip 2 of a two-ply sheet 17 that is connected together. The sling 13 is then provided with deformations, e.g. through puckering, torsion or twist, by being pulled through the opening 55 of the apparatus 49. The thus initially stretched sling 13 is then wrapped around the object, such as a closet 26 or a transport unit 5.

The loop 14 is used in a similar manner and may be separated along the partition seam 37 from the plastic sheet 2 which is connected together along its longitudinal edge 35 through a bonding seam 36 or a welding seam. The loop 14 thus created is deformed and stretched and can then be used for wrapping the object such as articles 3 or transport unit 5, without effecting an elongation that precludes an elastic return.

While the invention has been illustrated and described as embodied in an apparatus for and method of securing articles and/or packaging containers during transport on pallets, it is not intended to be limited to the details shown since various modifications and structural changes may be made without departing in any way from the spirit of the present invention.

What is claimed as new and desired to be protected by Letters Patent is set forth in the appended claims:

1. An elastic band for securing an object for transport, comprising a plastic sheet exhibiting an elongation limited to an elastic range of the sheet and formed to a string-like or band-like elastically stretchable strap which has deformations substantially extending in longitudinal direction of the sheet and is stretchable at least partially at elastic deformation, said strap being made from a pre-stretched plastic sheet and formed as a structure surrounding the object and selected from the group consisting of sling and loop, with the loop being made by folding the plastic sheet once transversely to its longitudinal direction in such a manner that both longitudinal edges facing away from one another are connectable in overlying relationship.

2. An elastic band for securing an object for transport, comprising an elastically stretchable string-like or band-like strap capable of surrounding an object and made from a pre-stretched, two-ply sheet of plastic material, with overlying ends of each plastic sheet being connected at attachment points, said strap exhibiting an elongation limited to an elastic range of the sheet and having deformations substantially extending in longitudinal direction of the sheet.

3. The band of claim 2 wherein the strap wrapped around the object snugly fits around the object as a consequence of a return force generated by an elastic elongation.

4. The band of claim 2 wherein the deformations are formed by folds.

5. The band of claim 4 wherein the sheet exhibits essentially parallel neighboring sections to form the folds.

6. The band of claim 2 wherein the deformations are formed as windings, with sections of the sheet being intertwined.

7. The band of claim 2 wherein the sheet is puckered transversely to the longitudinal direction of the strap.

8. The band of claim 2 wherein the strap has twisted sheet sections.

9. The band of claim 2 wherein the strap is rolled to a roll extending in longitudinal direction and exhibiting a spiral-shaped cross section.

10. The band of claim 2 wherein the deformations are of uniform configuration.

11. The band of claim 2 wherein the deformations are of irregular configuration.

12. The band of claim 2 wherein the strap exhibits two bounding side edges extending on spiral-like manner about a longitudinal axis of the strap.

13. The band of claim 2 wherein the deformed strap in unstretched configuration exhibits an air-filled void volume with a specific weight of less than 0.5 g/cm$^3$.

14. The band of claim 13 wherein the specific weight of the void volume is less than 0.3 g/cm$^3$.

15. The band of claim 2 wherein the cross section of the deformed strap decreases during stretching.

16. The band of claim 15 wherein the cross section of the deformed strap decreases to less than a quarter of the cross section of the unstretched strap during stretching.

17. The band of claim 2 wherein the deformed strap exhibits an elongation exceeding circumferential dimensions of the object after being wrapped and compensated by an inherent elastic deformation of the strap.

18. The band of claim 2 wherein the strap is pre-stretched at a range between 200% and 400% in relation to its unstretched length.

19. The band of claim 2 wherein the plastic sheet is made of a material selected from the group consisting of PVC, polyethylene, polyester, and polypropylene.

20. The band of claim 19 wherein the plastic sheet is made of linear low density polyethylene (LLDPE).

21. The band of claim 2 wherein the plastic sheet has a width, material strength and is made of a material that are suited to each other such that the deformed strip is stretchable by hand.

22. The band of claim 2 wherein the plastic sheet before deformation has a width between 50 mm and 800 mm.

23. The band of claim 22 wherein the plastic sheet has a width between 100 and 400 mm.

24. The band of claim 2 wherein the unstretched plastic sheet has a thickness between 0.01 mm and 0.1 mm.

25. The band of claim 24 wherein the unstretched plastic sheet has a thickness between 0.01 mm and 0.05 mm.

26. The band of claim 2 wherein the plastic sheet has a tear resistance ranging between 25 N/mm$^2$ and 40 N/mm$^2$.

27. The band of claim 26 wherein the tear resistance exceeds 35 N/mm$^2$.

28. The band of claim 2 wherein the strap is separated prior to provision of deformation from a web of plastic sheet.

29. The band of claim 28 wherein the plastic sheet is formed with partition points.

30. The band of claim 29 wherein the plastic sheet is perforated in the area of the partition points.

31. The band of claim 2 wherein the structure is formed by connecting together opposing ends of the strip.

32. The band of claim 2 wherein the two-ply sheet is connected together in a region of the attachment points through a joining process selected from the group consisting of welding, interlacing and bonding.

33. The band of claim 2 wherein the strap exhibits an endless, closed configuration.

34. The band of claim 2 wherein the deformed strap is wrapped around the object in one layer.

35. The band of claim 2 wherein the deformed strap is wrapped around the object in two planes perpendicular to each other and crossing at two intersections.

36. The band of claim 35 wherein at least one intersection one section of the deformed strap is intertwined with another section of the strap.

37. An elastic band for securing an object for transport, comprising a plastic sheet exhibiting an elongation limited to an elastic range of the sheet and formed to a string-like or band-like elastically stretchable strap which has deformations substantially extending in longitudinal direction of the sheet and is stretchable at least partially at elastic deformation, said strap being made from a pre-stretched plastic sheet and formed as a structure surrounding the object and selected from the group consisting of sling and loop, with neighboring slings of a plastic sheet exhibiting therebetween at least one attachment point incorporating therein a partition.

38. The band of claim 37 wherein the attachment point between two neighboring slings is formed by two sections between which the partition extends and which are respectively associated to the neighboring slings.

39. The band of claim 37 wherein the partition is formed as a perforation.

* * * * *

UNITED STATES PATENT AND TRADEMARK OFFICE
CERTIFICATE OF CORRECTION

PATENT NO. : 5,791,020
DATED : August 11, 1998
INVENTOR(S) : Hans-Peter Eichstädt It is certified that error appears in the above-identified patent and that said Letters Patent is hereby corrected as shown below:

Claim 36, line 23, delete "one section"

Signed and Sealed this

Twenty-seventh Day of April, 1999

Attest:

Q. TODD DICKINSON

Attesting Officer     Acting Commissioner of Patents and Trademarks